United States Patent
Huang

(10) Patent No.: US 6,745,874 B1
(45) Date of Patent: Jun. 8, 2004

(54) ANTI-BRAKE SYSTEM FOR BICYCLES

(76) Inventor: Tan-Cheng Huang, 6Fl., No. 2-1, Swei St., Taichung (TW)

( * ) Notice: Subject to any disclaimer, the term of this patent is extended or adjusted under 35 U.S.C. 154(b) by 0 days.

(21) Appl. No.: 10/347,716

(22) Filed: Jan. 20, 2003

(51) Int. Cl.⁷ .............................. B62L 5/00; F16D 55/02
(52) U.S. Cl. ..................................... 188/26; 188/24.19
(58) Field of Search .............................. 188/17, 18 A, 188/18 R, 24.12, 24.19, 24.21

(56) References Cited

U.S. PATENT DOCUMENTS 6,148,964 A * 11/2000 Huang ......................... 188/26
6,230,850 B1 * 5/2001 Huang ..................... 188/24.21
6,334,513 B1 * 1/2002 Chern ........................ 188/71.7
6,340,074 B1 * 1/2002 Lumpkin et al. ............. 188/26
6,659,234 B1 * 12/2003 Huang ......................... 188/26
6,666,304 B1 * 12/2003 Huang ..................... 188/24.19

* cited by examiner

Primary Examiner—Christopher P. Schwartz
(74) Attorney, Agent, or Firm—Charles E. Baxley

(57) ABSTRACT

A brake system includes two springs which are connected to a frame and when the initial force applied to the brake system when braking is larger than the force of the spring, the frame is shifted so as to reduce the initial force to the rider and the disk can be released for very short period of time. After the initial force is reduced, the spring force moves the frame back and the disk is clamped again.

5 Claims, 9 Drawing Sheets

ANTI-BRAKE SYSTEM FOR BICYCLES

FIELD OF THE INVENTION

The present invention relates to a brake system for bicycles, and more particularly, to an anti-brake system for bicycles.

BACKGROUND OF THE INVENTION

A conventional disk brake system for bicycles is shown in FIG. 1 and generally includes an arm 1, a clamp assembly 2 and a brake cable 3. Although the disk brake system is welcomed by the users for its stable and sharp braking, it could brake too sharp so that the rider cannot control the bicycle especially when the bicycle is ridden at a high speed. The initial force makes the rider to fall if the brake system is activated too sharp.

The present invention intends to provide a disk brake system wherein the disk is not clamped during braking so as to reduce the initial force applied to the riders.

SUMMARY OF THE INVENTION

In accordance with one aspect of the present invention, there is provided a brake system connected to a front fork or seat stays and activated by a brake cable so as to clamp a disk. The brake system comprises a frame located on a side of the disk and a rack is arranged on a side of the frame. A positioning member is fixed to the front fork or the seat stays. A clamping assembly is movably connected onto the disk and operatively connected to the frame and the positioning member. The clamping assembly includes a clamp member which has a slot in which the disk is received therein. A passage is defined in the clamp member and two blocks are located below the passage. An activation member is slidably received in the passage of the clamp member and is connected to the frame. A groove is defined in each of two sides of the activation member and two springs are received in the two grooves. One of tow ends of each of the springs is engaged with a protrusions extending from an insides of each of the grooves, and the other end of each of the springs contacts the blocks. A pawl is located in the clamp member and includes teeth engaged with the rack. A plurality of beads are installed at a side of the pawl. A main shaft is located in the clamp member and between a side of the disk and the pawl. A plurality of tear-shaped recesses are defined in a side of the disk portion and each recess includes a shallow portion and a deep portion. The beads are movably received in the recesses. An adjusting cover is located in the clamp member and on the other side of the disk. Two linings are located on the two sides of the disk and between the main shaft and the adjusting cover. The linings may clamp the disk when the brake cable is pulled.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
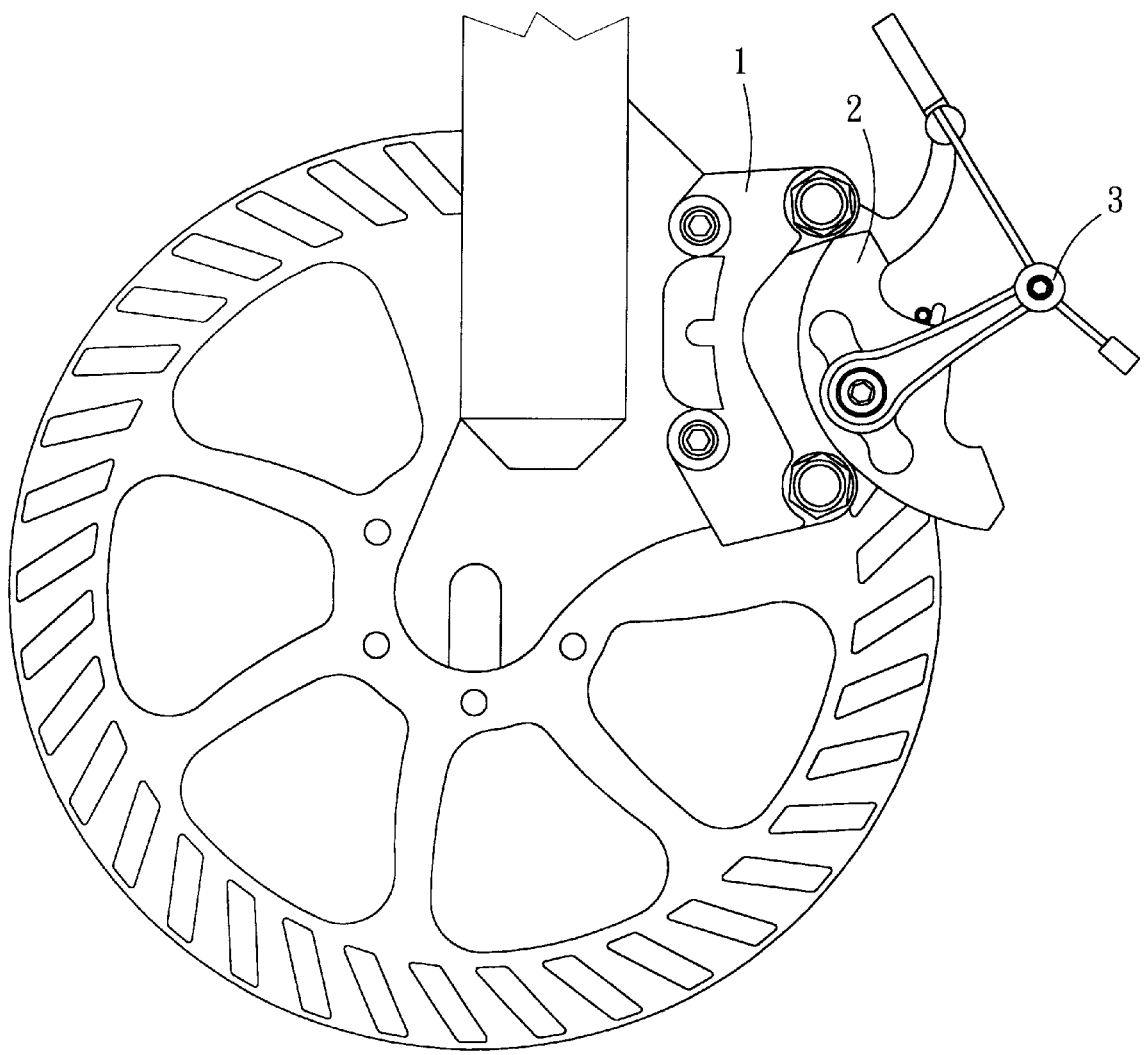
FIG. 1 shows a conventional brake system.
Figure 2:
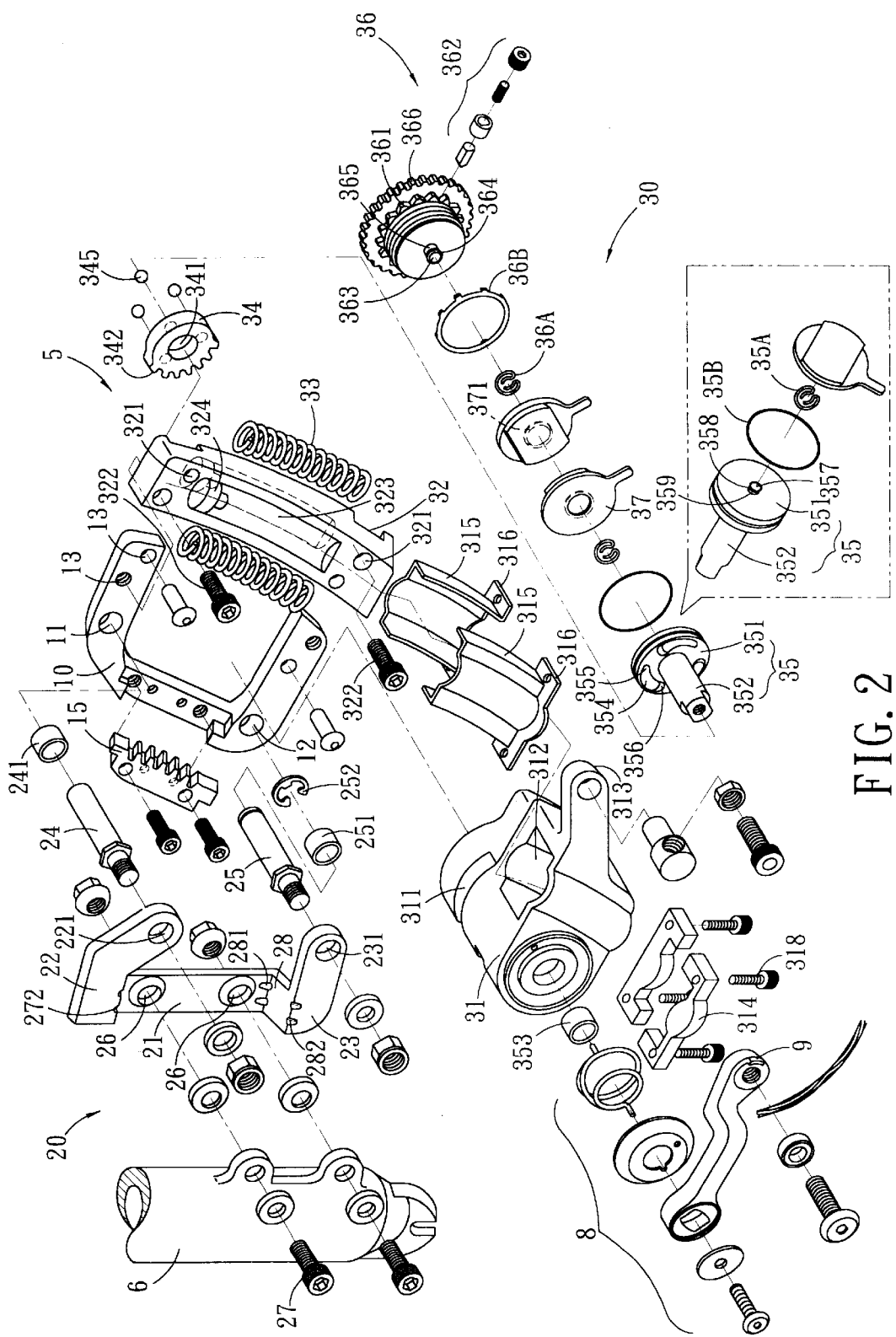
FIG. 2 is a perspective view to show the brake system of the present invention.
Figure 3:
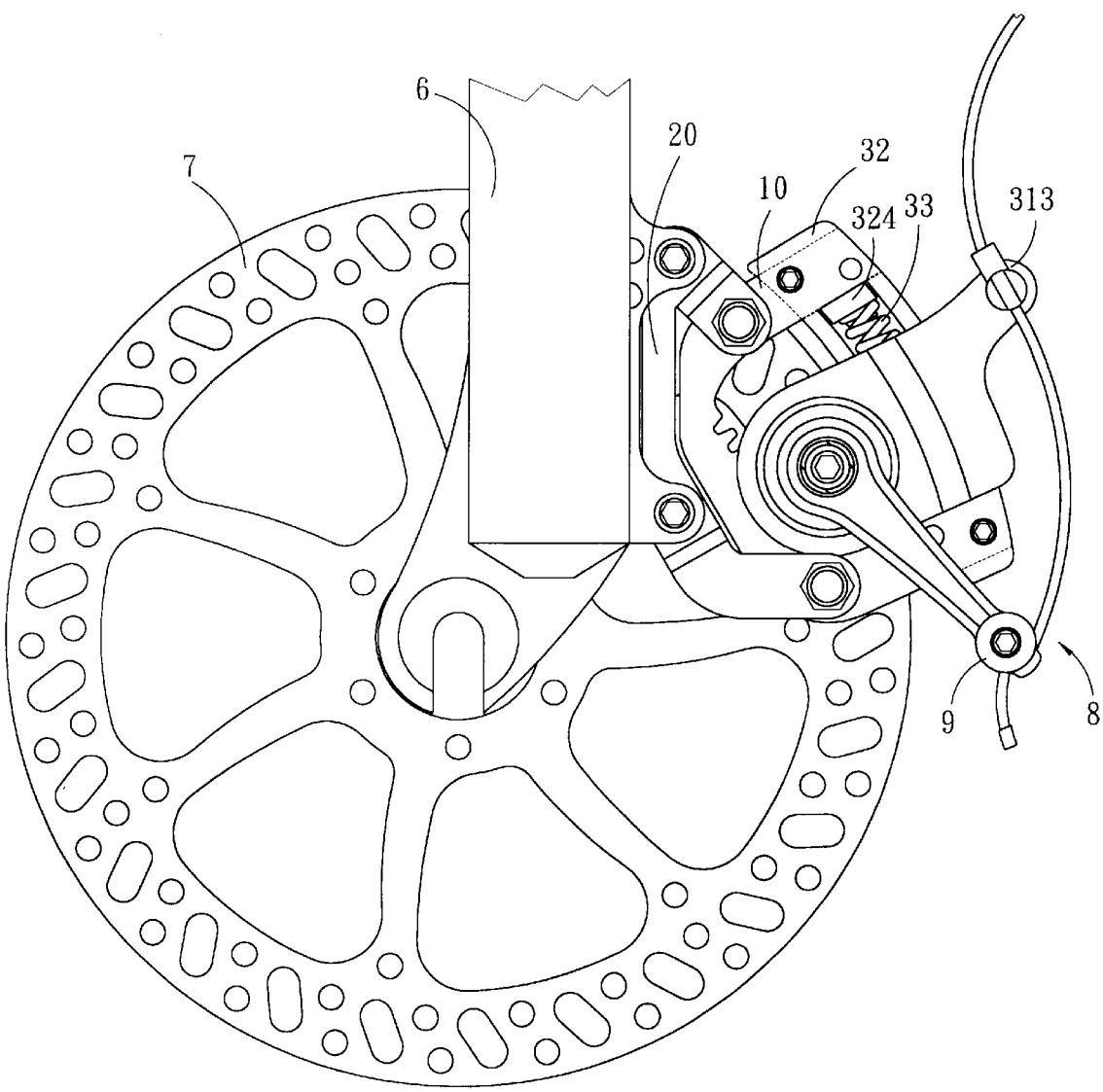
FIG. 3 is a plane view to show the brake system of the present invention.
Figure 4:
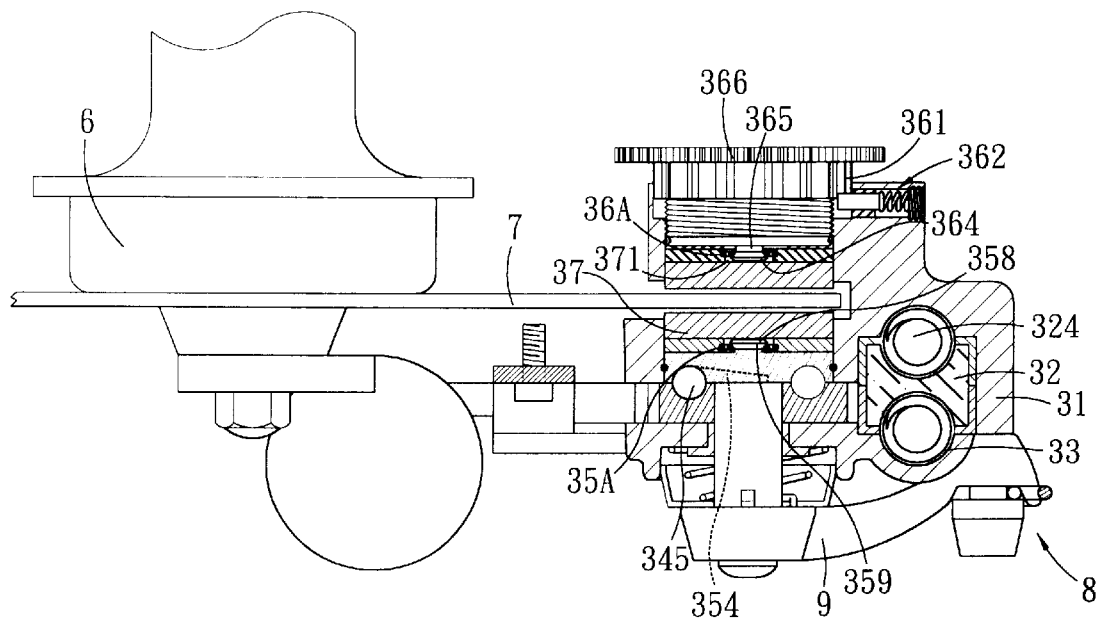
FIG. 4 shows the cross sectional view taken from the plane 4—4 as illustrated in FIG. 3.

Referring to FIG. 2, the brake system of the present invention can be installed on the front fork 6 or the seat stays and is activated by a brake cable 8 connected to an arm 9, so that disk 7 is clamped. The brake assembly 5 comprises a frame 10, a positioning member 20 and a clamping assembly 30. The frame 10 is located on a side of the disk 7 and has holes 11, 12, 13 on an upper portion and a lower portion thereof. A rack 15 is arranged on a side of the frame 10.

The positioning member 20 includes a main part 21 which has two threaded holes 26 so as to be fixed to the front fork 6 or the seat stays. A first part 22 and a second part 23 are connected to the main part 21. The first part 22 has a hole 221 through which a first adjusting rod 24 is connected, the other end of the first adjusting rod 24 is engaged with the hole 11 in the frame 10. The second part 23 has a hole 231 through which a second adjusting rod 25 is connected, the other end of the second adjusting rod 25 is engaged with the other hole 12 in the frame 10. The first part 22 and the second part 23 are parallel with each other. A bush 241 is mounted to the first adjusting rod 24. Another bush 251 and a C-shaped clamp 252 are respectively mounted to the second adjusting rod 25. An off-set portion 28 is formed on the main part 21 and reinforcement ribs 281 and 282 are defined in the off-set portion 28.

The clamping assembly 30 is movably connected onto the disk 7 and operatively connected to the frame 10 and the positioning member 20. The clamping assembly 30 includes a clamp member 31 which has a slot 311 in which the disk 7 is installed, and a passage 312 is defined in the clamp member 31. An extension 313 extends from the clamp member 31 so as to be connected to the brake cable 8. Two blocks 314 are located at a bottom of the passage 312 and two durable plates 315 are inserted in the passage 31. Each durable plate 315 includes a flange 316 so as to be fixed to the blocks 314 by bolts 318.

An activation member 32 is slidably received in the passage 312 of the clamp member 31 and has two threaded holes 321 so as to be connected to the frame 10 by extending bolts 322 through the threaded holes 321 and engaged with the frame 10. A groove 323 is defined in each of two sides of the activation member 32 and two springs 33 are received in the two grooves 323. One of tow ends of each of the springs 33 is engaged with a protrusions 324 extending from an insides of each of the grooves 323, the other end of each of the springs 33 is compressed by the blocks 314.

A pawl 34 is located in the clamp member 31 and includes a central hole 341. The teeth 342 on the pawl 34 are engaged with the rack 15 and a plurality of beads 345 are installed at a side of the pawl 34 facing the disk 7.

A main shaft 35 is located in the clamp member 31 and between a side of the disk 7 and the pawl 34. The main shaft 35 has a disk portion 351 with a O-ring 35B and a shank 352 extends from a side of the disk portion 351. The shank 352 with a bush 353 mounted thereon extends through the central hole 341 of the pawl 34 and the clamp member 31. A plurality of tear-shaped recesses 354 are defined in a side of the disk portion 351 and each recess 354 includes a shallow portion 355 and a deep portion 356. The beads 345 are movably engaged with the recesses 354. A nipple 357 extends from the other side of the disk portion 351 and toward the disk 7. A head 358 is formed on the nipple 357 and an engaging groove 359 is defined in the nipple 357 so that a flexible clamp 35A is engaged with the engaging groove 359.

An adjusting cover 36 is located in the clamp member 31 and on the other side of the disk 7. The adjusting cover 36 includes teeth 361 on a periphery thereof and a holding portion 366. A stopper assembly 362 is engaged with the teeth 361. A nipple 363 extends from the adjusting cover 36 and toward the disk 7. A head 364 is formed on the nipple 363 and an engaging groove 365 is defined in the nipple 363 so that a flexible clamp 36A is engaged with the engaging groove 365. A durable ring 36B is mounted to the adjusting cover 36 so that the adjusting cover 36 can be moved toward the disk 7 by rotating the holding portion 366.

Two linings 37 are located on the two sides of the disk 7 and between the main shaft 35 and the adjusting cover 36. Each lining 37 has a concavity 371 defined in a side which faces the nipple 357/363 so that the two flexible clamps 35A and 36A are received in the concavities 371. The two linings 37 are connected to the main shaft 35 and the adjusting cover 36 by the expansion of the two flexible clamps 35A, 36A. When the brake cable 8 is pulled, the linings 37 clamp the disk 7.

Figure 5:
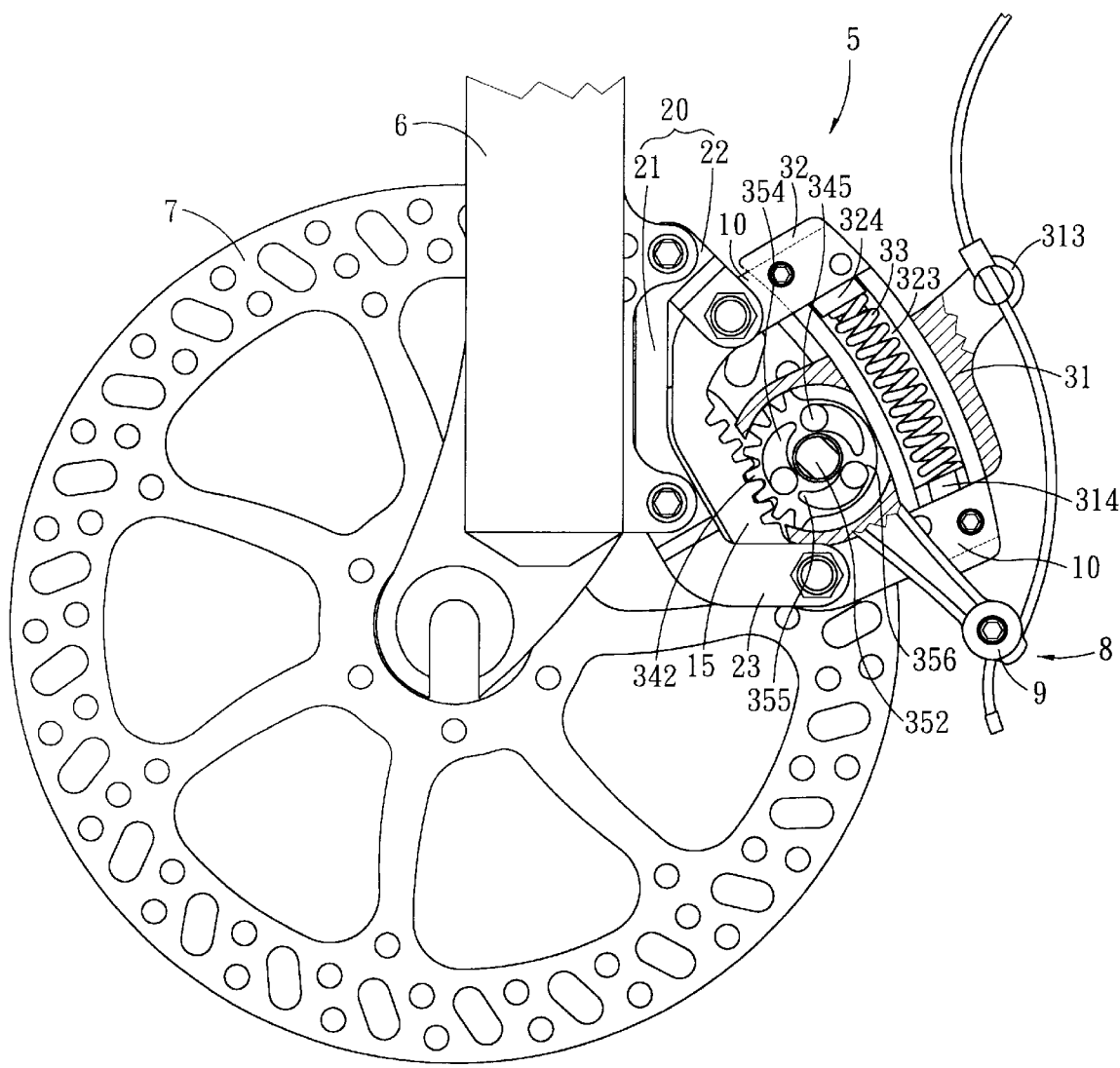
FIG. 5 shows that the brake system of the present invention is not yet activated.
Figure 6:
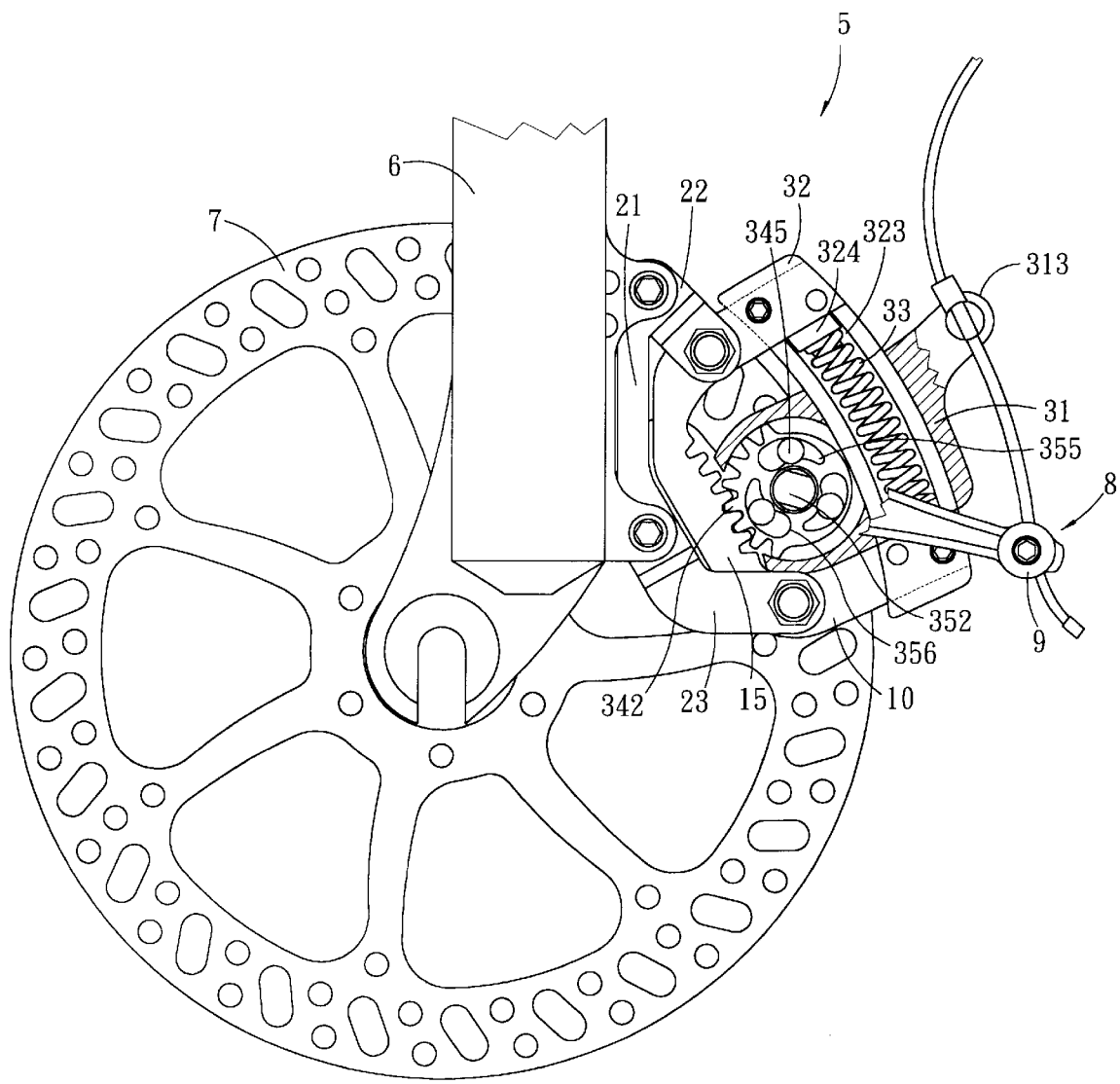
FIG. 6 shows that the brake system of the present invention is activated.

Referring to FIGS. 5 to 8, when the brake system is activated at a high speed, the brake cable 8 pivots the arm 9 to let the main shaft 35 rotated counter clockwise. The tear-shaped recesses 354 are rotated with the main shaft 35 and the beads 345 are moved from the deep portion 356 to the shallow portion 355. The beads 345 are then protruded from the recesses 354 and push the main shaft 35 toward the disk 7 and the two linings 37 clamp the disk 7 as shown in FIGS. 5 and 6.

Figure 7:
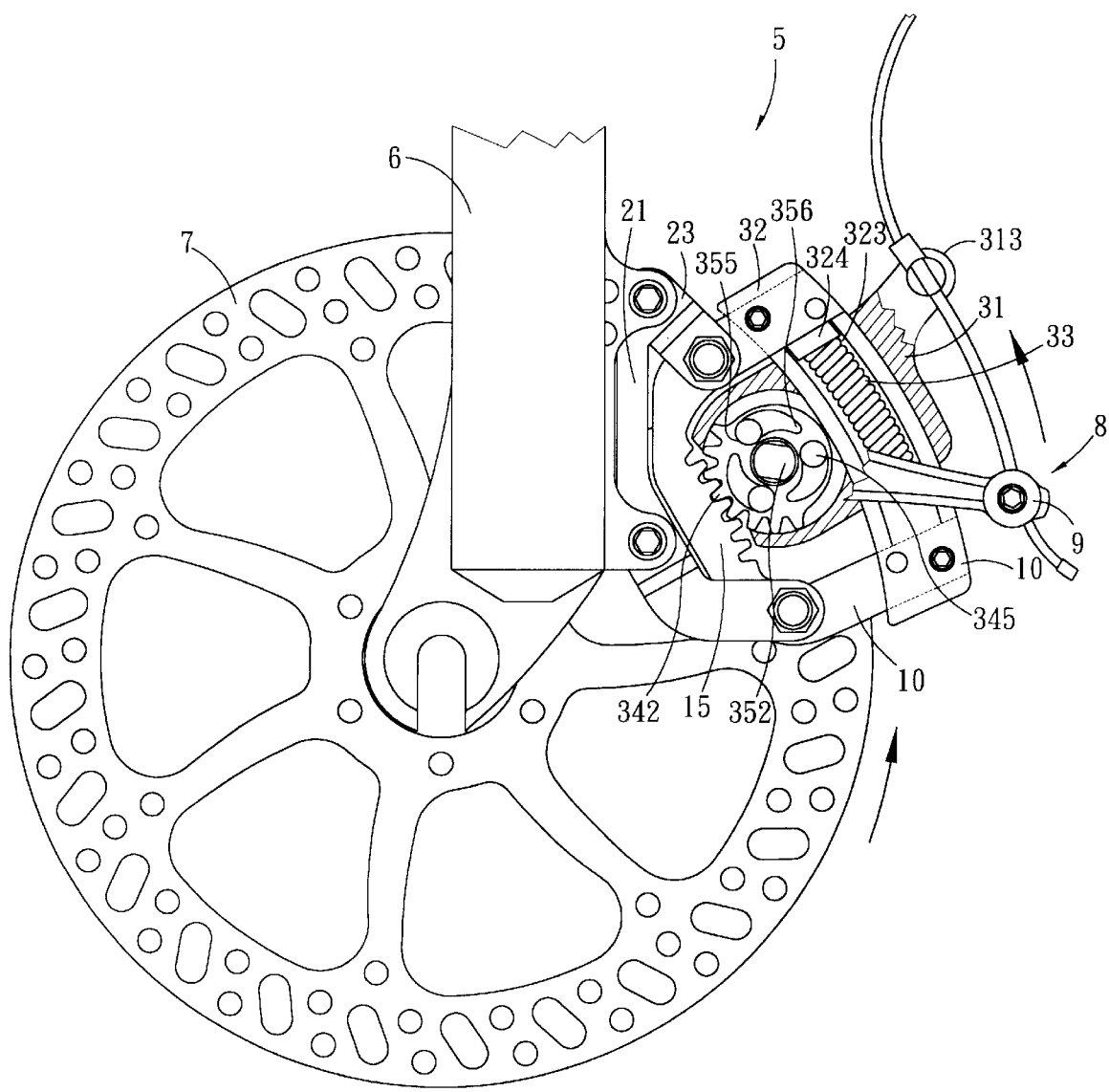
FIGS. 7 and 8 show the actions that the brake system of the present invention is activated and the disk is discontinuously clamped.

When the initial force is larger than the force of the springs 33, the disk 7 drives the clamping assembly 30 along the direction of the groove 323 of the activation member 32, so that the blocks 314 of the clamp member 31 compress the springs 33. The pawl 34 is rotated counter clockwise by the rack 15 so that the beads 345 move from the shallow portions 355 to the deep portion 356 of the recesses 354. This makes the linings 37 disengage the disk 7 as shown in FIG. 7.

Figure 8:
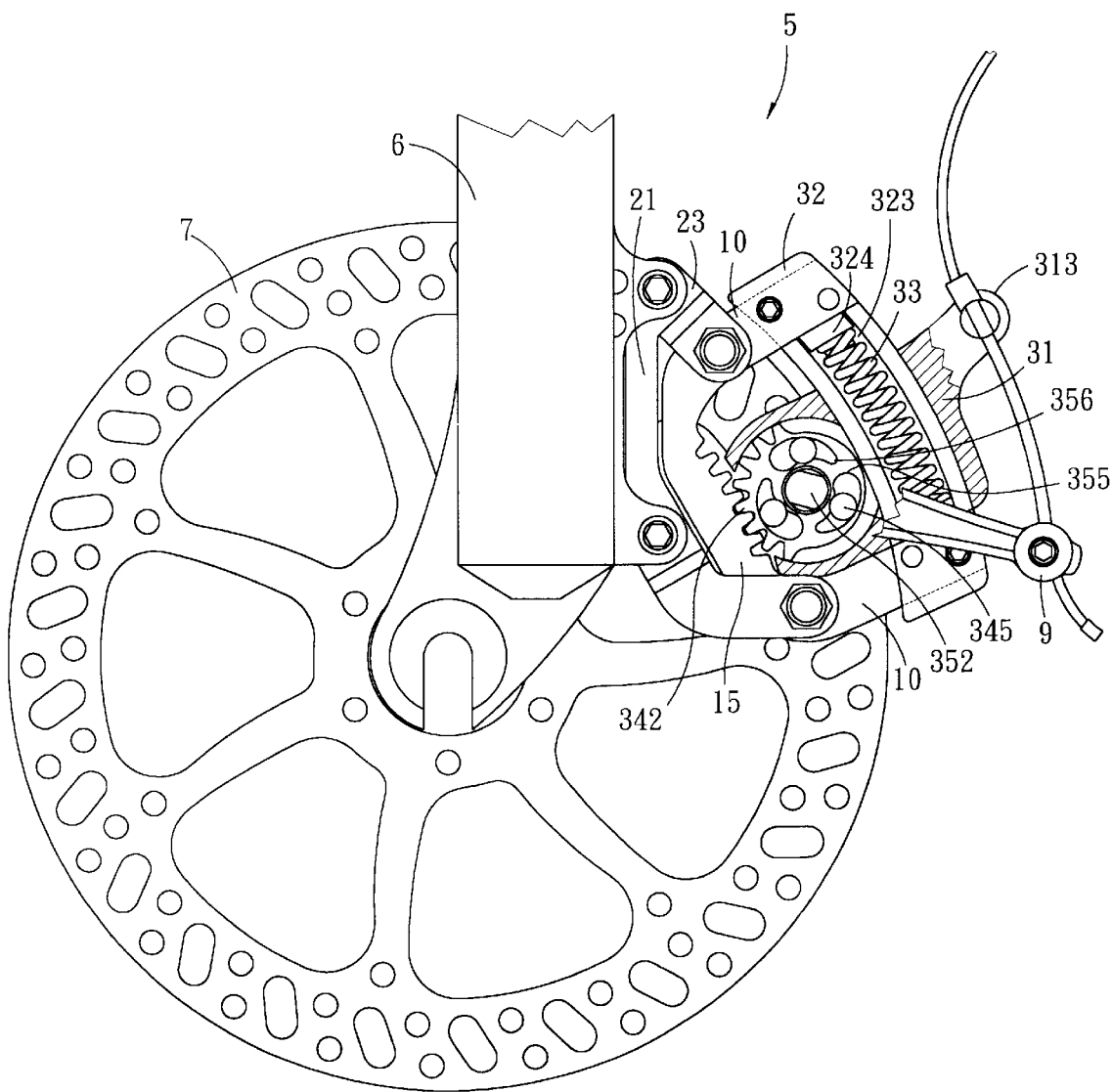

After a small gap of time two or three thousandth second, the initial force is less than the force of the springs 33, the clamping assembly 30 is pushed back to its original position and the pawl 34 is rotated clockwise and the beads 345 again protrude and push the main shaft 35 to let linings 37 clamp the disk 7 again as shown in FIG. 8. The disk 7 is clamped and released within a very short period of time so as to prevent the rider from falling by the initial force.

Figure 9:
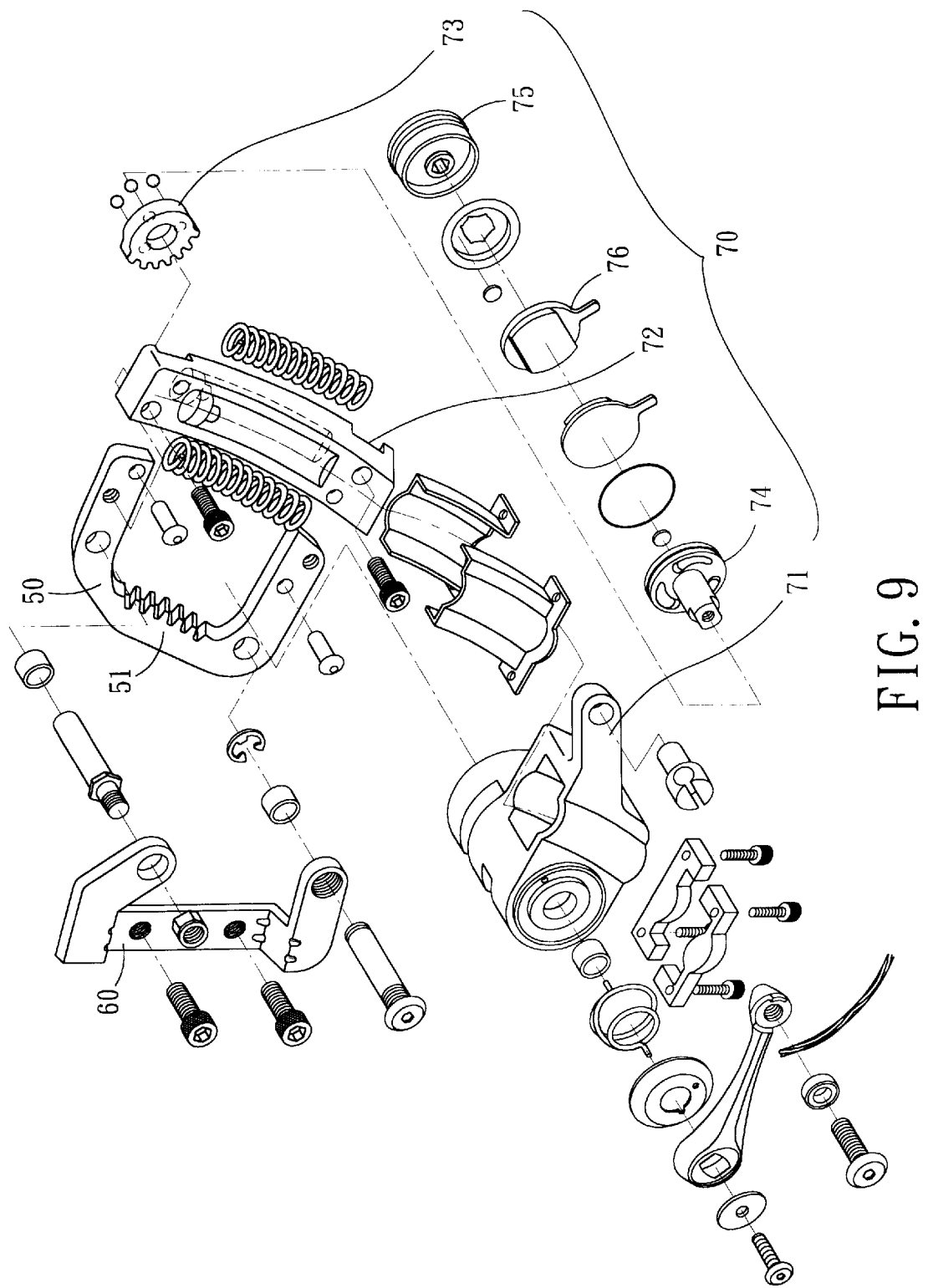
FIG. 9 is an exploded view to show another embodiment of the brake system of the present invention.

FIG. 9 shows another embodiment of the present invention wherein the brake system includes a frame 50, a positioning member 60, and a clamping assembly 70 which includes a clamp member 71, a activation member 72, a pawl 73, a main shaft 74, an adjusting cover 75 and two linings 76, wherein the frame 50 and the rack 51 are made into a one-piece member.

While we have shown and described the embodiment in accordance with the present invention, it should be clear to those skilled in the art that further embodiments may be made without departing from the scope of the present invention.

What is claimed is:

1. A brake system adapted to be connected to a front fork or seat stays and activated by a brake cable so as to clamp a disk, the brake system comprising:

a frame located on a side of the disk and a rack arranged on a side of the frame;

a positioning member including a main part which is adapted to be fixed to the front fork or the seat stays;

a clamping assembly adapted to be movably connected onto the disk, and operatively connected to the frame and the positioning member, the clamping assembly including a clamp member which has a slot so as to be adapted to receive the disk therein, a passage defined in the clamp member and two blocks located below the passage;

an activation member slidably received in the passage of the clamp member and connected to the frame, a groove is defined in each of two sides of the activation member and two springs received in the two grooves, one of two ends of each of the springs engaged with protrusions extending from the insides of each of the grooves, the other end of each of the springs contacting the blocks;

a pawl located in the clamp member and including teeth engaged with the rack, a plurality of beads installed at a side of the pawl;

a main shaft located in the clamp member and between a side of the disk and the pawl, a plurality of tear-shaped recesses defined in a side of the disk portion and each recess including a shallow portion and a deep portion;

an adjusting cover located in the clamp member and on the other side of the disk, and two linings located on the two sides of the disk and between the main shaft and the adjusting cover, the linings adapted to clamp the disk when the brake cable is pulled.

2. The brake system as claimed in claim 1, wherein the activation member has two threaded holes so as to be connected to the frame by bolts.

3. The brake system as claimed in claim 1, wherein two durable plates are inserted in the passage of the activation member and the activation member is located between the two durable plates.

4. The brake system as claimed in claim 1, wherein the adjusting cover has teeth defined in a periphery thereof so as to be engaged with a stopper assembly.

5. The brake system as claimed in claim 1, wherein pawl has a central hole and a plurality of beads are installed to a side of the pawl, the beads movably received in the tear-shaped recesses of the disk portion of the main shaft.

* * * * *